US012592202B2

(12) United States Patent
Kim et al.

(10) Patent No.: US 12,592,202 B2
(45) Date of Patent: Mar. 31, 2026

(54) DISPLAY DEVICE AND DRIVING METHOD THEREOF

(71) Applicant: LG Display Co., Ltd., Seoul (KR)

(72) Inventors: Miso Kim, Paju-si (KR); Youngho Kim, Paju-si (KR); Namkon Ko, Paju-si (KR); Nanyi Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/916,599

(22) Filed: Oct. 15, 2024

(65) Prior Publication Data

US 2025/0209996 A1 Jun. 26, 2025

(30) Foreign Application Priority Data

Dec. 20, 2023 (KR) ........................ 10-2023-0187341

(51) Int. Cl.

*G09G 3/3275* (2016.01)
*G09G 3/20* (2006.01)
*G09G 3/3233* (2016.01)

(52) U.S. Cl.

CPC ......... *G09G 3/3275* (2013.01); *G09G 3/2092* (2013.01); *G09G 3/3233* (2013.01); *G09G 2300/0842* (2013.01); *G09G 2330/021* (2013.01)

(58) Field of Classification Search

CPC ......... G09G 3/2092; G09G 3/32–3291; G09G 2310/0264; G09G 2310/027–0275; G09G 2310/06; G09G 2310/066; G09G 2310/08; G09G 2320/0219; G09G 2320/0223; G09G 2330/021; G09G 2330/025; G09G 2370/08; G09G 2370/14

See application file for complete search history.

(56) References Cited

U.S. PATENT DOCUMENTS 8,421,792 B2 4/2013 Chung
2011/0157142 A1 6/2011 Chung
2021/0280114 A1* 9/2021 Wang ........................ G09G 3/20
2022/0139325 A1* 5/2022 Lee ........................ G09G 3/3266
345/694

FOREIGN PATENT DOCUMENTS

KR 10-2011-0077394 A 7/2011

* cited by examiner

*Primary Examiner* — Roberto W Flores
(74) *Attorney, Agent, or Firm* — Fenwick & West LLP

(57) ABSTRACT

Disclosed is a display device, comprising: a display panel including pixels; a data driver configured to generate sensing data comprising a sensing result that is indicative of feature values of the pixels and convert the sensing data into a differential signal where an amplitude of the differential signal is varied by the data driver based on a pattern of the sensing data and output the differential signal; and a timing controller configured to receive the differential signal, generate a compensation value for compensating image data based on the differential signal and transmit the compensation value to the data driver, wherein the data driver is configured to compensate the image data based on the compensation value received from the timing controller.

17 Claims, 10 Drawing Sheets

DISPLAY DEVICE AND DRIVING METHOD THEREOF

CROSS REFERENCE TO RELATED APPLICATION

The present application claims priority to Republic of Korea Patent Application No. 10-2023-0187341, filed Dec. 20, 2023, which is hereby incorporated by reference in its entirety.

FIELD

The present disclosure relates to a display device, and a method for driving the same.

BACKGROUND

As information society has developed, various demands on display devices displaying images are increasing, and various display devices such as a liquid crystal display (LCD), and an organic light emitting display (OLED) have been utilized.

A driving transistor provided in pixels of the display device has feature values such as a threshold voltage, a degree of mobility and the like, and when pixels are degraded as the drive time is prolonged, the feature values may change. In order to compensate the change of the feature values, a method for compensating data to be applied to the pixels based on the sensing values after driving the sensing of the display device and sensing the feature values of the pixels may be applied.

SUMMARY

The embodiments provide a display device with reduced power consumption required for the pixel sensing, and a method for driving the display device.

The embodiments provide a display device capable of reducing power consumption required for transmission of sensing data by optimizing a transmission voltage value according to a pattern of sensing data provided from the data driver to the timing controller, and a method for driving the display device.

In one embodiment, a display device comprises: a display panel including a plurality of pixels; a data driver configured to generate sensing data that is indicative of feature values of the plurality of pixels, convert the sensing data into a differential signal where an amplitude of the differential signal is varied by the data driver based on a pattern of the sensing data, and output the differential signal; and a timing controller configured to receive the differential signal, generate a compensation value for compensating image data based on the differential signal, and transmit a compensation value to the data driver, wherein the data driver is configured to compensate the image data based on the compensation value received from the timing controller.

In one embodiment, a method for driving a display device comprises: setting an initial value of an amplitude of a differential signal in correspondence with digital data of sensing data; obtaining the sensing data that is indicative of feature values of a plurality of pixels, the sensing data including a pattern; determining a final amplitude of the differential signal by maintaining the initial value of the amplitude of the differential signal or varying the initial value based on the pattern of the sensing data; and outputting the differential signal having the final amplitude.

In one embodiment, a display device comprises: a display panel including a plurality of pixels; a data driver configured to generate sensing data that is indicative of feature values of the plurality of pixels, convert the sensing data into a differential signal, and output the differential signal; and a timing controller configured to compensate image data based on the differential signal and transmit a compensation value to the data driver, vary an amplitude of the differential signal based on a pattern of the sensing data, and transmit control data comprising information on the varied amplitude to the data driver.

In one embodiment, a display device comprises: a pixel including a driving transistor having a first electrode, a second electrode, and a third electrode, a light emitting element connected to the second electrode of the driving transistor, a sensing transistor connected to the second electrode of the driving transistor and the light emitting element, and a storage capacitor connected to the first electrode and the second electrode of the driving transistor; a sensing line connected to the sensing transistor; a data driver configured to generate sensing data that is indicative of a feature value of the pixel based on a sensing value received from the sensing line and convert the sensing data into a differential signal where an amplitude of the differential signal is varied by the data driver based on a pattern of the sensing data; and a timing controller configured to receive the differential signal from the data driver and generate a compensation value for compensating image data based on the differential signal, wherein the data driver is configured to compensate the image data based on the compensation value received from the timing controller and transmit the compensated image data to the pixel.

The display device and the method for driving the same according to the embodiments may reduce power consumption by adaptively adjusting a transmission voltage value of the sensing data during a sensing process. The display device and the method for driving the same according to the embodiments may reduce design complexity with respect to the timing controller, by controlling the transmission voltage value through the data driver.

DETAILED DESCRIPTION

Figure 1:
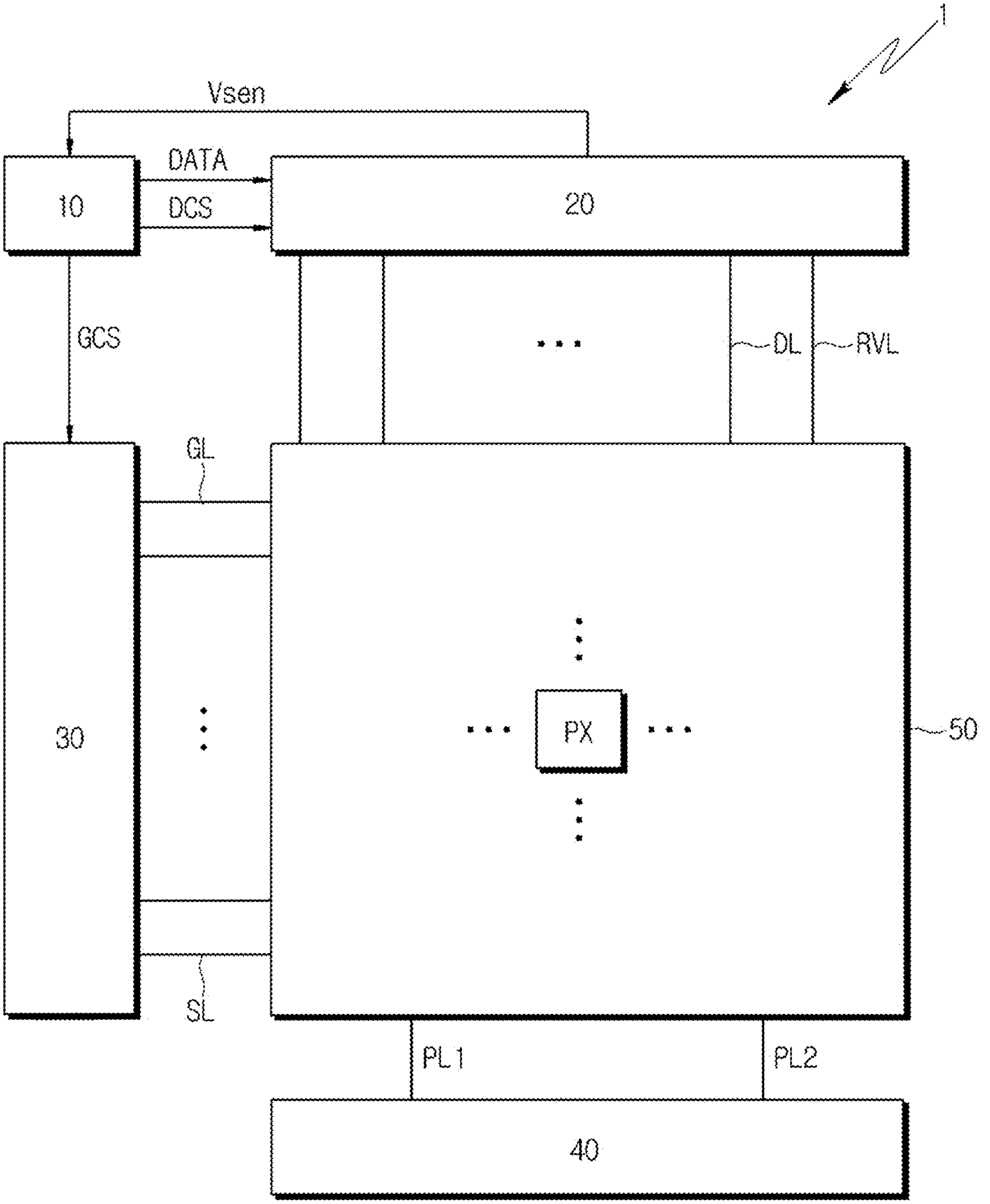
FIG. 1 is a block diagram illustrating a display device according to an embodiment.

Hereinafter, aspects according to the present disclosure will be described with reference to the accompanying drawings. In this specification, when a component (or region, layer, part, etc.) is referred to as being "on", "connected" to, or "joined" to another component, it means that the component may be directly connected/coupled to another component or the component can be connected/coupled to another component with a third component in between.

The same reference numbers refer to the same components. In addition, in the drawings, the thickness, ratio, and dimensions of the components are exaggerated for effective description of technical content. Terms "and/or" include one or more combinations capable of being defined by associated configurations.

Terms such as "first" and "second" may be used to describe various components, but the components are not limited by the terms. The terms are used only for the purpose of distinguishing one component from other components. For example, the first component may be referred to as a second component without departing from the scope of rights of various aspects, and similarly, the second component may also be referred to as a first component. Singular expressions include plural expressions unless the context clearly indicates otherwise.

The terms such as "below", "lower", "above", "upper", etc. are used to describe the association of the components shown in the drawings. The terms are relative concepts and are explained on the basis of the directions indicated in the drawings.

It should be understood that terms such as "comprise" or "have" is intended to designate the presence of features, numbers, steps, operations, components, parts or combinations thereof described in the specification, but not to exclude the possibility of the presence or addition of one or more other features or numbers, steps, operations, components, parts, or combinations thereof.

FIG. 1 is a block diagram illustrating a display device according to an embodiment.

Referring to FIG. 1, the display device 1 includes a timing controller 10, a data driver 20, a gate driver 30, a power supply 40, and a display panel 50.

The timing controller 10 may receive a control signal and image data from an external system (for example, a host) and generate a source control signal DCS and a gate control signal GCS. The control signal may include a data enable signal, a horizontal synchronization signal, a vertical synchronization signal, and a main clock signal etc.

The gate control signal GCS may include a scan timing control signal such as a gate start pulse, a gate shift clock and a gate output enable signal. The source control signal DCS may include a data timing control signal such as a source sampling clock, a polarity control signal and a source output enable signal.

The timing controller 10 may be disposed in a control printed circuit board which is connected to a source printed circuit board to which the data driver 20 is bonded, through a connecting medium such as a flexible flat cable (FFC) or a flexible printed circuit (FPC). For example, the timing controller 10 may be connected to the data driver 20 through a pair of embedded clock P-P interface lines (EPI) to receive and transmit data.

The data driver 20 may convert image data DATA in a digital format provided from the timing controller into an analog data voltage according to the source control signal DCS. The data driver 20 may apply the analog data voltage to the corresponding pixels PX through the data lines DL.

In an embodiment, the data driver 20 may be further connected to the pixels PX through a lead-out line RVL (e.g., a sensing line). The data driver 20 may provide a reference voltage to the pixels PX through the lead-out line RVL, or sense states of the pixels PX based on electrical signals fed back from the pixels PX. In such an embodiment, the timing controller 10 may compensate image data and generate compensated image data based on sensing data Vsen obtained through the data driver 20. The compensation of the image data may be compensation for one or more among a threshold voltage of a driving transistor provided in the pixel PX, a degree of mobility and/or an operating point voltage of the organic light emitting diode. The quality deterioration such as stains of the display panel 50 may be improved as the compensated image data is provided to the data driver 20.

The data driver 20 may be configured as a source drive circuit or a source drive integrated circuit. The data driver 20 may be connected to a bonding pad of the display panel 50 by a tape automated bonding (TAB) method or a chip on glass (COG) method, or may be directly disposed on the display panel 50, and in some cases, the data driver 20 may be integrated with the display panel 50.

The gate driver 30 may output a scan signal sequentially per one horizontal period within a frame through the gate line GL in response to the gate control signal CGS provided from the timing controller 10. Accordingly, a pixel row connected to each gate line GL is turned on per one horizontal period. During one horizontal period, a data voltage may be applied to the pixel row which is turned on by the gate line GL.

In an embodiment, the gate driver 30 may be further connected to the pixels PX through a sensing line SL. The gate driver 30 may apply a sensing signal to the pixels PX through the sensing line SL during a period for sensing the pixels PX.

The gate driver 30 may be configured with stage circuits connected to each of the plurality of gate lines GL, and may be configured in a gate in panel GIP form which allows the gate driver 30 to be mounted on the display panel 50. Such a gate driver 30 may include a shift register, or a level shifter etc.

The power supply 40 converts the voltage input from the outside into a high potential voltage ELVDD and a low potential voltage ELVSS which are reference powers used inside the display device 1, and outputs the voltages to the constituent components through power lines PL1 and PL2. The power supply 40 may be disposed on the control printed circuit board on which the timing controller 10 is disposed. The power supply 40 may be referred to as a power management integrated circuit (PMIC).

In the display panel 50, a plurality of pixels PX (or, referred to as subpixels) are disposed. For example, the pixels PX may be disposed in a matrix form in the display panel 50. The pixels PX disposed in one pixel row are connected to the same gate line GL, and the pixels PX disposed in one pixel column may be connected to the same data line DL. The pixels PX may emit light at a brightness corresponding to the data voltage provided through the data lines DL.

In an embodiment, each of the pixels PX may display any one color among red, green, and blue. In another embodiment, each of the pixels PX may display any one color among cyan, magenta, and yellow. In various embodiments, each of the pixels PX may display any one color among red, green, blue, and white.

The timing controller 10, the data driver 20, the gate driver 30, and the power supply 40 may be configured as each separate integrated circuit (IC) or, as an integrated circuit in which at least some among them are integrated.

Figure 2:
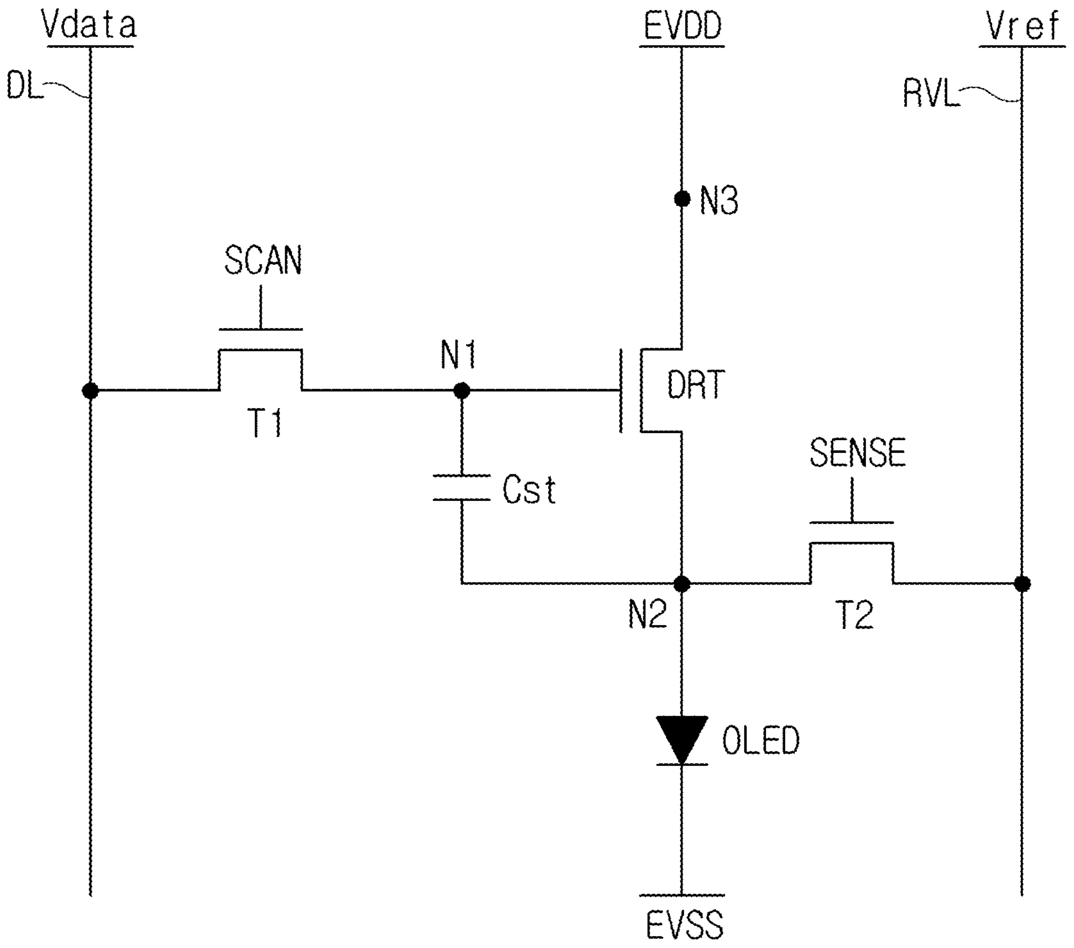
FIG. 2 is a circuit diagram illustrating a pixel illustrated in FIG. 1 according to an embodiment.

FIG. 2 is a circuit diagram illustrating the pixel illustrated in FIG. 1 according to an embodiment.

Referring to FIG. 2, the pixel PX may include an organic light emitting diode (OLED), a driving transistor DRT for driving the organic light emitting diode (OLED), a first transistor T1 for providing a data voltage to a first node N1, which corresponds to a gate node of the driving transistor DRT, and a storage capacitor Cst maintaining a data voltage corresponding to an image signal voltage or a voltage corresponding to the data voltage for the time of one frame.

The organic light emitting diode (OLED) may include a first electrode (e.g., anode electrode or a cathode electrode), an organic layer, a second electrode (e.g., cathode electrode or an anode electrode), and so on. The low potential voltage ELVSS may be applied to the second electrode of the organic light emitting diode (OLED).

The driving transistor DRT drives the organic light emitting diode (OLED) by supplying a driving current to the organic light emitting diode (OLED). The driving transistor DRT may have a first node N1, a second node N2, and a third node N3. The first node N1 of the driving transistor DRT is the gate node, and may be electrically connected to a source node or a drain node of the first transistor T1. The second node N2 of the driving transistor DRT may be electrically connected to the first electrode of the organic light emitting diode (OLED). The third node N3 of the driving transistor DRT may be a node to which the driving voltage ELVDD is applied.

The first transistor T1 may be electrically connected between the data line DL and the first node N1 of the driving transistor DRT, and receive the scan signal SCAN through the gate node. The first transistor T1 may provide the data voltage Vdata which is turned on by the scan signal SCAN and provided from the data line DL to the first node N1 of the driving transistor DRT.

The storage capacitor Cst may be electrically connected between the first node N1 and the second node N2 of the driving transistor DRT.

As the time during which the pixels PX are driven is prolonged, degradation of circuit elements such as the driving transistor DRT and the organic light emitting diodes (OLED) may proceed. Accordingly, values of unique features of circuit elements such as the driving transistor DRT and the organic light emitting diodes (OLED) may change. Here, the feature values may include a threshold voltage of the organic light emitting diodes (OLED), a threshold voltage of the driving transistor DRT, and a degree of mobility of the driving transistor DRT, etc.

The change of feature values of the circuit elements may cause a change of the brightness of the corresponding pixel PX. In addition, a degree of change of feature values between the circuit elements may be different according to a degree of degradation of the pixels PX. The difference of feature values may cause deviation of brightness between pixels.

In order to prevent or at least reduce the above-mentioned problem, the pixel PX according to an embodiment may include a compensation circuit capable of sensing the feature value of the pixel PX and compensating for the change of the feature value.

Referring to FIG. 2, the pixel PX may further include a second transistor T2. The second transistor T2 may be electrically connected between the second node N2 of the driving transistor DRT and the lead-out line RVL for supplying the reference voltage Vref, and may be controlled by receiving a sensing signal SENSE which is a kind of the scan signal through the gate node. The second transistor T2 may be turned on by the sensing signal SENSE, and apply the reference voltage Vref supplied through the lead-out line RVL to the second node N2 of the driving transistor DRT. In addition, the second transistor T2 may be utilized as one of voltage sensing paths for the second node N2 of the driving transistor DRT.

In an embodiment, the scan signal SCAN and the sensing signal SENSE may be separate scan signals. In this case, the scan signal SCAN and the sensing signal SENSE may be, via different gate lines, applied to a gate node of the first transistor T1, and a gate node of the second transistor T2, respectively.

In another embodiment, the scan signal SCAN and the sensing signal SENSE may be the same scan signals. In this case, the scan signal SCAN and the sensing signal SENSE may be applied commonly to the gate node of the first transistor T1, and the gate node of the second transistor T2 via the same gate line.

Figure 3:
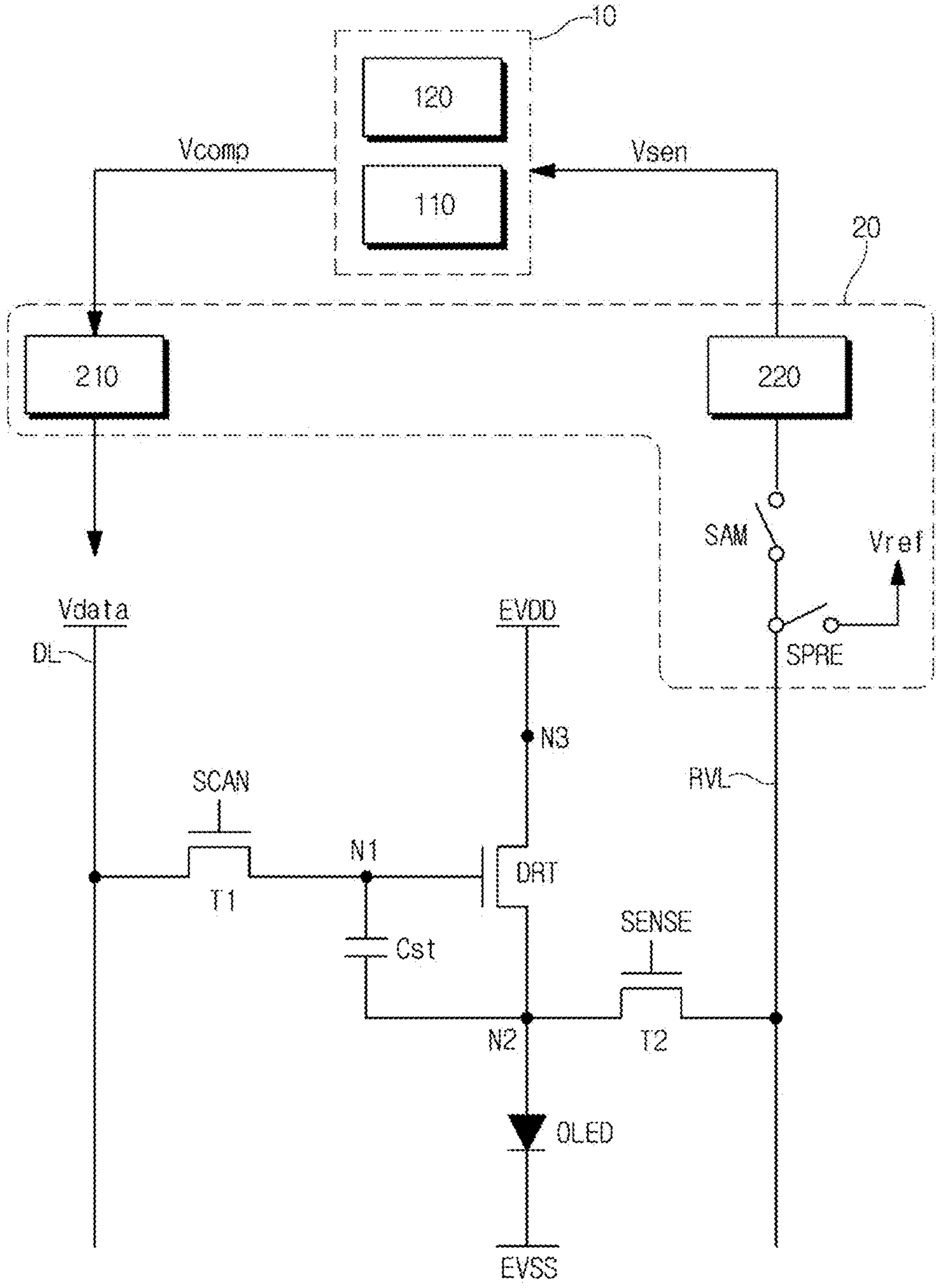
FIG. 3 is a diagram illustrating a compensation circuit according to an embodiment.

FIG. 3 is a diagram illustrating the compensation circuit according to an embodiment.

Referring to FIG. 3, the display device 1 may include a sensing part 220 configured to generate sensing data Vsen through sensing of the pixel PX and output the sensing data Vsen, a compensation part 110 configured to determine the feature value of the pixel PX using the sensing data Vsen and performing a compensation process for compensating for the feature value, and a memory 120 configured to store the compensation value Vcomp generated in the compensation part 110 etc. The sensing part 220 may be provided inside the data driver 20 as illustrated, and the compensation part 110 and the memory 120 may be provided inside the timing controller 10.

The display device 1 may further include an initialization switch SPRE configured to control turning on or off of the lead-out line RVL, and a sampling switch SAM configured to control connection between the lead-out line RVL and the sensing part 220.

The initialization switch SPRE may control a state of voltage application of the second node N2 of the driving transistor DRT such that the state of voltage application of the second node N2 of the driving transistor DRT inside the pixel PX becomes the voltage state which reflects the wanted feature values of the circuit element. When the initialization switch SPRE is turned on, the reference voltage Vref may be supplied to the lead-out line RVL and may be applied to the second node N2 of the driving transistor DRT, through the second transistor T2 which is turned on.

A sampling switch SAM is turned on, and electrically connects the lead-out line RVL and the sensing part 220 to each other. The sampling switch SAM may be controlled to be turned on when the second node N2 of the driving transistor DRT has the voltage state which reflects the wanted feature values of the circuit element. When the sampling switch SAM is turned on, the sensing part 220 may sense the voltage of the connected lead-out line RVL.

The sensing part 220 may convert the sensing voltage in an analog format which is sensed through the lead-out line RVL into a digital format to generate the sensing data Vsen, and may provide the sensing data Vsen to the compensation part 110 and/or the memory 120.

The compensation part 110 (e.g., a circuit) may determine the feature values (for example, a threshold voltage, a degree of mobility etc.) of the circuit elements (for example, the driving transistor DRT and/or the light emitting diodes (OLED)) inside the corresponding pixel PX based on the sensing data Vsen provided from the sensing part 220, and may perform a process for compensating the feature values.

In more detail, the compensation part 110 may calculate the compensation value Vcomp (for example, offset, gain etc.) for compensating feature values based on the sensing data Vsen, store the calculated compensation value in the memory 120 and/or provide the compensation value to the data driver 20. The data driver 20 may supply the data voltage Vdata to which the compensation value is applied to the corresponding pixel PX through a data supplying part 210. As such a compensation of the feature values of the pixel is performed, brightness deviation between pixels PX may be reduced, and the image quality may be improved.

Figure 4:
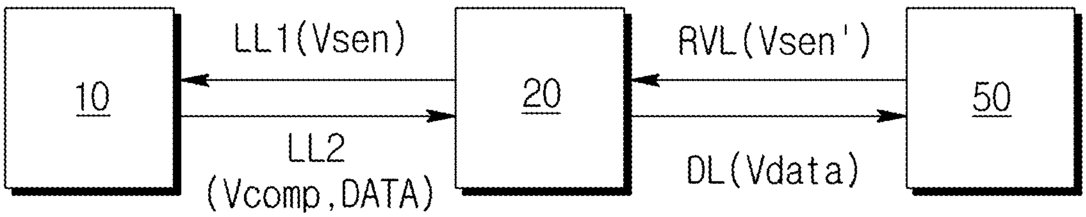
FIG. 4 is a diagram illustrating a method for transmitting sensing data according to an embodiment.

FIG. 4 is a diagram illustrating a method for transmitting sensing data according to an embodiment.

Referring to FIG. 4 and FIG. 3 together, the data driver 20 may transmit and receive an electrical signal in an analog format through the lead-out line RVL of the display panel 50. For example, the data driver 20 may transmit the reference voltage Vref to the lead-out line RVL of the display panel 50, and receive a sensing value Vsen' in an analog format including the feature values of the circuit elements provided in the pixel PX through the lead-out line RVL.

The data driver 20 may convert the sensing value Vsen' in an analog format into the sensing value in a digital format through an analog to digital converter ADC and may generate the sensing data Vsen. In addition, the data driver 20 may transmit the sensing data Vsen to the timing controller 10 through a first signal line LL1.

In an embodiment, the first signal line LL1 may be configured to receive and transmit signals conforming to a low voltage differential signaling (LVDS) interface (e.g., a first interface protocol). The LVDS interface is the interface allowing information to be provided through a differential signal. Each of two signals constituting the differential signal is transmitted through lines, each of which are formed as a pair. In such an embodiment, the data driver 20 may generate a differential signal by changing the sensing signal into a differential signal corresponding to the LVDS data format, and may transmit the generated differential signal to the timing controller 10 through a pair of lines of the first signal line LL1.

The timing controller 10 may calculate the compensation value Vcomp for compensating for the feature values of the circuit elements provided in the pixel PX based on the received sensing data Vsen. In addition, the timing controller 10 may transmit the calculated compensation value Vcomp to the data driver 20 through a second signal line LL2.

In an embodiment, the second signal line LL2 may be configured to receive and transmit signals conforming to the embedded clock point to point (EPI) interface (e.g., a second interface protocol). In such an embodiment, the timing controller 10 may transmit the compensation value Vcomp generated in the EPI data format, together with a clock training pattern, various control data, and image data DATA, to the data driver 20 through the second signal line LL2.

The data driver 20 may compensate the image data DATA based on various control data and the compensation value received through the second line LL2, and convert the compensated image data into a data voltage Vdata in an analog format through a digital to analog converter (DAC). The data driver 20 may transmit the converted data voltage Vdata to the pixels PX of the display panel 50 through the data line DL.

Figure 5:
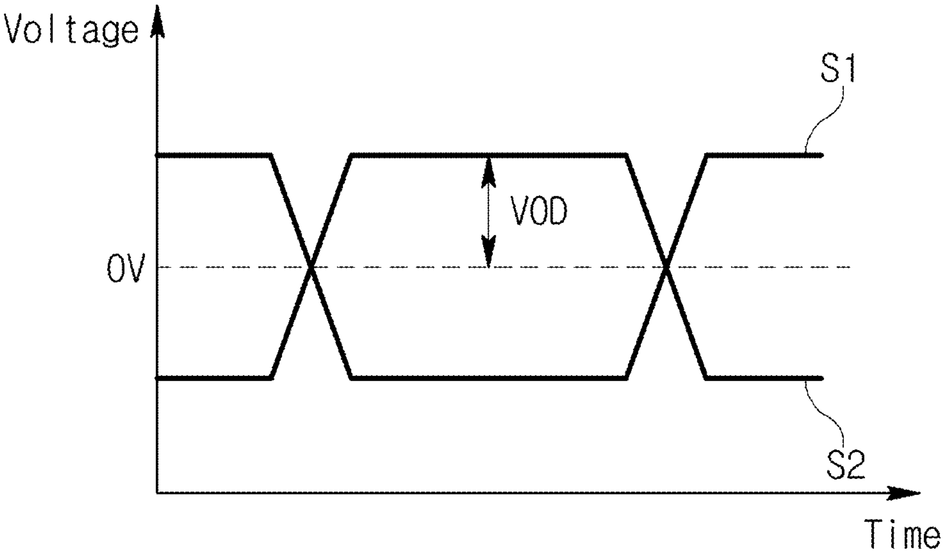
FIG. 5 is a waveform diagram illustrating a differential signal according to an embodiment.

FIG. 5 is a waveform diagram illustrating the differential signal according to an embodiment.

Referring to FIG. 5, the digital data may be configured with the differential signals formed of two signals S1 and S2 having the same frequency and voltage of differential VOD (i.e. amplitude) and phases opposite to each other in the LVDS interface. The two signals S1 and S2 may take a form of swinging at a certain voltage of differential VOD. The voltage of differential of the two signals S1 and S2 is determined to reflect a value of the original digital data. For example, when converting 2-bit digital data into two differential signals, a bit value and the voltage of differential VOD corresponding to the bit value of the digital data may be defined as Table 1 below.

TABLE 1

| Bit value (2-bit) | VOD |
|---|---|
| "LL" | 200 mV |
| "LH" | 250 mV |
| "HL" | 300 mV |
| "HH" | 350 mV |

The voltage of differential VOD corresponding to the digital data, that is, a swing width of the differential signal may be determined in consideration of a transmission loss such as a driving environment (for example, operation environment, transmission line environment) of the display device 1. For example, if external noise is severe or a transmission delay is great, the voltage of differential VOD may be set to be great (e.g., a first value), and on contrary, if the external noise is small or the transmission delay is small, the voltage of differential VOD may be set to be small (e.g., a second value that is less than the first value).

The voltage of differential VOD may be determined in advance when manufacturing the display device 1, and may be stored in the memory 120 of the timing controller 10 or the memory (not illustrated) of the data driver 20 and the like.

Figure 6:
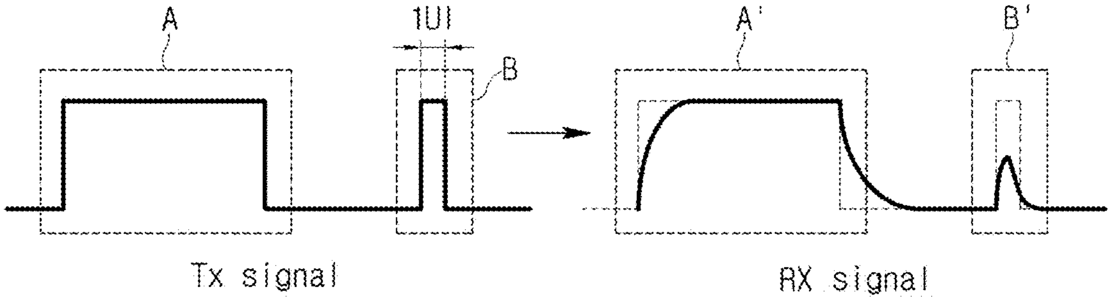
FIG. 6 is a waveform diagram illustrating a transmission loss of digital data according to an embodiment.

FIG. 6 is a waveform diagram illustrating the transmission loss of digital data according to an embodiment.

Referring to a left drawing of FIG. 6, the digital data (for example, sensing data Vsen) transmitted from a transmission side Tx (for example, the data driver 20) may include a first pulse A having four UIs (unit interval) and a second pulse B having one UI. The illustrated digital data may be generated as a differential signal and may be transmitted through a signal line.

A reception side Rx (for example, the timing controller 10) may recover digital data from the received differential signal. The digital data recovered by the reception side may have a shape illustrated in the right drawing of FIG. 6 by the delay of the transmission line, and the external noise etc.

In case of the received first pulse A', because of long bit transmission time, the bit may be identified from the recovered digital data despite the transmission loss. On contrary, in case of the received second pulse B', because of short bit transmission time, the digital data may not be properly recovered due to the transmission loss.

Considering the transmission loss of one UI pulse such as the second pulse B, the voltage of differential (FIG. 5) may be set to have a sufficiently great margin. In such a case, the transmission loss may be compensated, but the power consumption of the data driver 20 and the timing controller 10 receiving and transmitting the differential signal may increase.

In order to address this problem, the display device 1 may be configured to adaptively vary the voltage of differential VOD of the differential signal.

Figure 7:
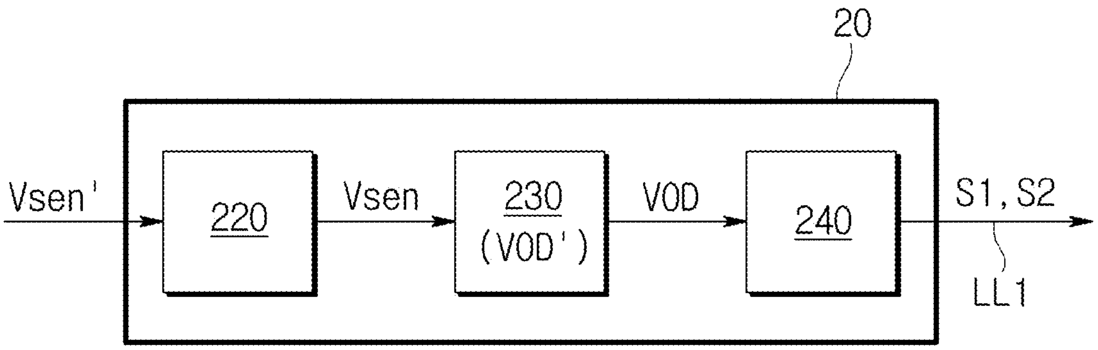
FIG. 7 is a block diagram illustrating a configuration of a data driver according to an embodiment.
Figure 8:
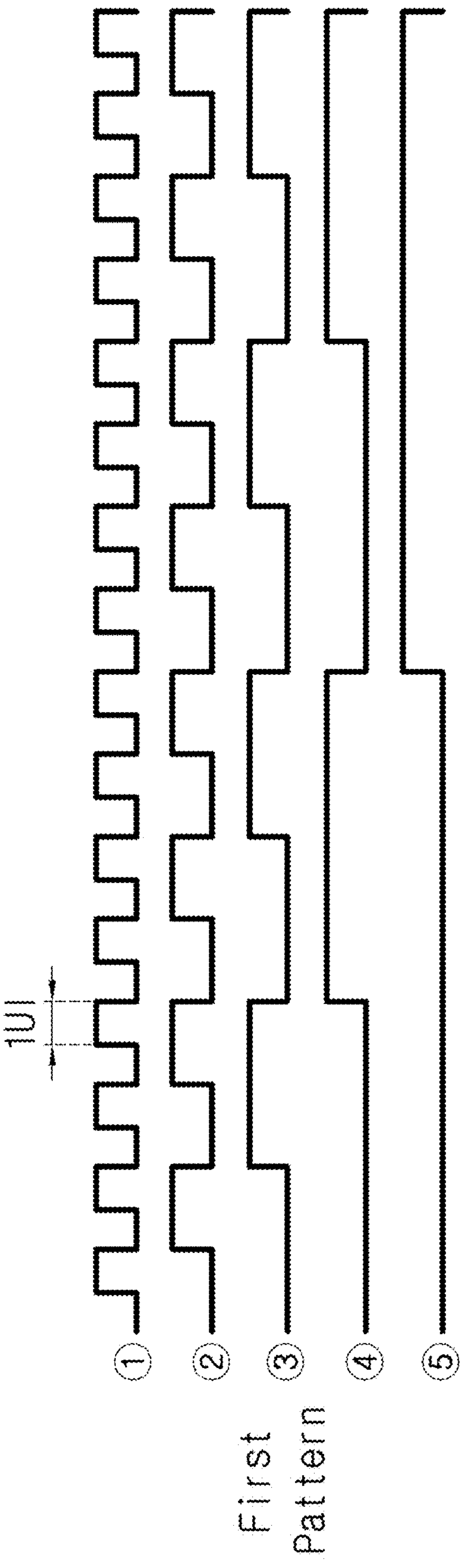
FIGS. 8 to 10 are waveform diagrams illustrating patterns of sensing data according to various embodiments.
Figure 9:
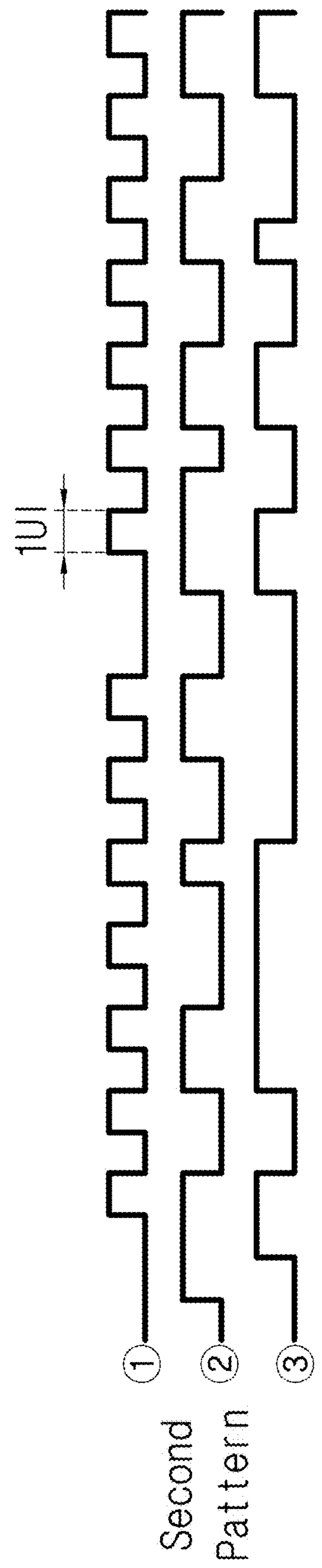
Figure 10:
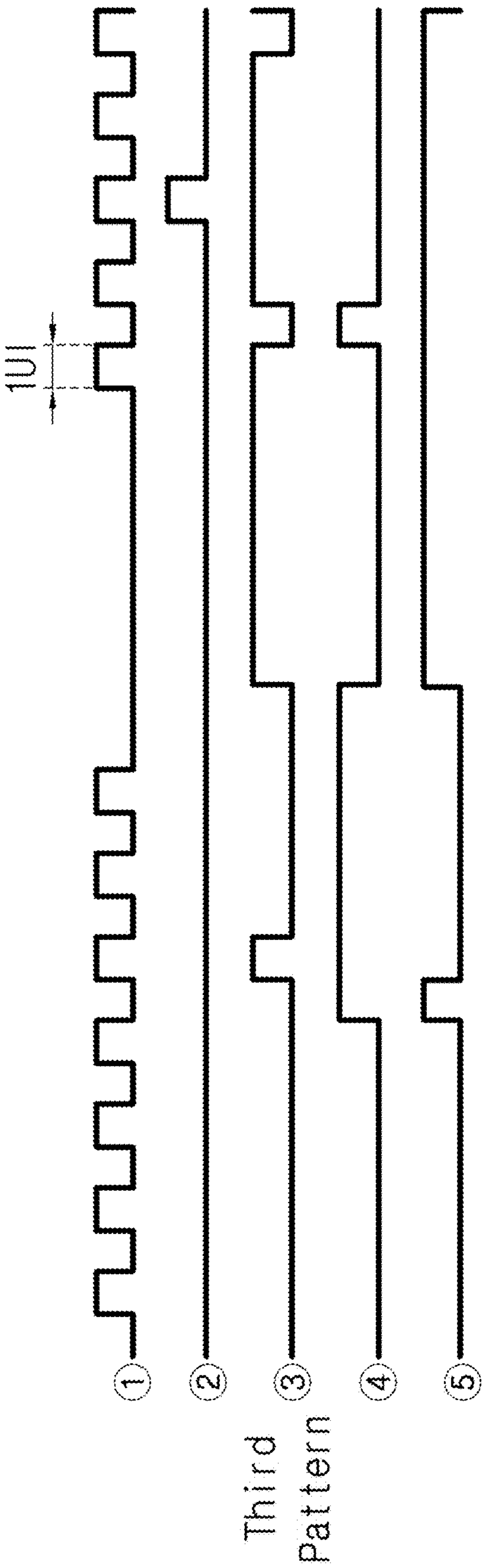

FIG. 7 is a block diagram illustrating a configuration of the data driver according to an embodiment. FIGS. 8 to 10 are waveform diagrams illustrating patterns of the sensing data according to various embodiments.

Referring to FIG. 7, the data driver 20 according to an embodiment may include the sensing part 220 (e.g., a sensing circuit), an analyzing part 230 (e.g., an analyzing circuit), and a differential signal generator 240 (e.g., a differential signal generator circuit).

The sensing part 220 may receive the sensing value Vsen' of the pixels PX and generate the sensing data Vsen in the digital format. The generated sensing data Vsen may be digital data and may be a pulse signal of which a logic high voltage and a logic low voltage are alternated in a certain pattern. For example, the sensing data Vsen may include at least one logic high period and at least one logic low period.

The analyzing part 230 may determine an initial amplitude of differential VOD' of the differential signal in correspondence with a bit value of the sensing data Vsen generated from the sensing part 220. The initial amplitude of differential VOD' of the differential signal according to the bit value of the sensing data Vsen may be determined in advance when the display device 1 is manufactured, and may be stored in the memory (not illustrated) of the data driver 20 and the like. The analyzing part 230 may load information on the initial amplitude of differential VOD' which has been stored and may determine the initial amplitude of differential VOD' of the differential signal in correspondence with the sensing data Vsen.

In addition, the analyzing part 230 may analyze a pattern of the sensing data Vsen, and may determine whether to vary the determined initial amplitude of differential VOD' in correspondence with the analyzed pattern.

The sensing data Vsen may have a pattern in correspondence with a certain standard. Here, the standard may include a size of the transmission loss described referring to FIG. 6. That is, the sensing data Vsen may have a pattern having a great transmission loss, or a pattern having a small transmission loss.

As described referring to FIG. 6, a great transmission loss may be generated with respect to the one UI pulse which occurs after a logic low period. Therefore, a pattern of the sensing data Vsen in an embodiment may be defined according to lengths of the logic high period and the logic low period. That is, the pattern of the sensing data Vsen is classified based on the length of the logic high period and the logic low period. For example, the pattern of the sensing data Vsen may be classified according to a length (e.g., a duration) of the logic low period before and/or after the pulse of one UI length (that is, the logic high period). In more detail, the pattern of the sensing data Vsen may be classified based on whether the pulse of one UI length is included and the length of the logic low period before and/or after the pulse of one UI length. Thus, the classification of the sensing data signifies an amount of transmission loss of the display device.

In an embodiment, a first pattern may be the pattern having the lowest degree of transmission loss occurrence, as illustrated in FIG. 8. For example, the first pattern may be the cases ②, ③, ④ and ⑤ in which the sensing data Vsen does not include the pulse having one UI length. That is, the first pattern lacks a pulse with one UI length due to the sensing data having the lowest degree of transmission loss.

In an embodiment, the first pattern may include a case ① which includes the pulse having the one UI length. However, even if the sensing data Vsen includes the pulse having the one UI length, if the logic high period of the pulse and the logic low period before and after the pulse have the same length, the transmission loss may not be generated. That applies the same if the sensing data Vsen includes a plurality of pulses, each of which having a length longer than the one UI. Therefore, in an embodiment, the first pattern may be further defined as cases ①, ②, ③, ④ and ⑤, of which a length of the logic low period before and/or after the pulse and a length of the logic high period of the pulses within the sensing data Vsen output during a preset period are the same.

In an embodiment, the second pattern may be a pattern having a higher degree of transmission loss occurrence than the first pattern, as illustrated in FIG. 9. For example, the second pattern may be defined as the cases ①, ② and ③ in which the sensing data Vsen output during a preset period includes the pulse of the one UI length, but allow the pulse of the one UI length to occur after (and/or before) the logic low period equal to or more than a first threshold value and less than a second threshold value. Here, the first threshold value may be two UIs and the second threshold value may be four UIs, but are not limited thereto.

In an embodiment, a third pattern may be a pattern having the highest degree of transmission loss occurrence, as illustrated in FIG. 10. For example, the third pattern may be defined as the cases ①, ②, ③, ④ and ⑤ in which the sensing data Vsen output during a preset period includes the pulse of the one UI length, but allow the pulse having the one UI length to occur after (and/or before) the logic low period equal to or more than the second threshold value. Here, the second threshold value may be four UIs, but is not limited thereto.

The kinds of the sensing data Vsen are not limited to the above-mentioned ones. That is, the kinds of the patterns of the sensing data Vsen may be defined according to various standards determined experimentally and/or theoretically only if the standards can classify the degree of the transmission loss occurrence. In addition, the pattern of the sensing data Vsen may be defined by one or a plurality of standards. Also, a threshold length of the standard for classifying the pattern may be variously selected, and may be set as a value or a range.

Further, the number of the patterns of the sensing data Vsen is not particularly limited. In FIGS. 8 to 10, an example in which the sensing data Vsen is classified into three patterns is illustrated, but the sensing data Vsen may be classified into the number of patterns less than or more than three.

The analyzing part 230 may determine which pattern the sensing data Vsen corresponds to based on a certain standard which has been defined per pattern. The analyzing part 230 may determine whether to vary the initial amplitude of differential VOD' of the differential signal based on the classified pattern of the sensing data Vsen.

For example, the analyzing part 230 may maintain the initial amplitude of differential VOD' of the differential signal which has been determined as it is, if the sensing data Vsen corresponds to a pattern having a relatively greater transmission loss (for example, the third pattern). The analyzing part 230 may step wisely reduce the initial amplitude of differential VOD' of the differential signal which has been determined, by as much as a certain voltage width (hereinafter, a step), if the sensing data Vsen corresponds to a pattern having a relatively smaller transmission loss.

In the embodiment, the step for reducing the initial amplitude of differential VOD' of the differential signal may be determined in correspondence with the degree of the transmission loss of the pattern of the sensing data Vsen. For example, if the degree of the transmission loss of the pattern of the sensing data Vsen is small, the initial amplitude of differential VOD' may be reduced by as much as one step, and if the degree of the transmission loss is great, the initial amplitude of differential VOD' may be reduced by as much as a greater step than the one step (for example, two or more steps).

For example, if the sensing data Vsen corresponds to the third pattern, the analyzing part 230 may determine the initial amplitude of differential VOD' of the differential signal as the final amplitude of differential VOD. That is, the initial amplitude of differential VOD' is maintained for a longer duration than if the sensing data Vsen corresponds to the second pattern or the first pattern. In addition, if the sensing data Vsen corresponds to the second pattern, the analyzing part 230 may reduce the initial amplitude of differential VOD of the differential signal by as much as a first step and determine the reduced voltage of differential as the final amplitude of differential VOD. In addition, if the sensing data Vsen corresponds to the first pattern, the analyzing part 230 may reduce the initial amplitude of differential VOD of the differential signal by as much as a second step and determine the reduced voltage of differential as the final amplitude of differential VOD.

In an embodiment, the width for reducing the initial amplitude of differential VOD' may be preset and stored in a table format. For example, the width for reducing the initial amplitude of differential VOD' may be defined as the Table 2 below.

TABLE 2

| Sensing data pattern | Width of differential signal |
|---|---|
| First pattern | reduce by as much as two steps |
| Second pattern | reduce by as much as one step |
| Third pattern | maintain |

In an embodiment, a difference between the first step and the second step, and a difference between the second step and a third step may be equal to or different from the first step. In addition, in an embodiment, a difference between the first step and the second step, and a difference between the second step and the third step may be set to be the same or set to be different. In an embodiment, a difference between the first step and the second step may be greater or smaller than the first step, and a difference between the second step and the third step may be greater or smaller than a difference between first step and the second step.

In the above example, the data driver 20 reduces the initial amplitude of differential VOD' of the differential signal according to the pattern of the sensing data Vsen. However, the present embodiment is not limited thereto. That is, in another embodiments, the data driver 20 may increase the initial amplitude of differential VOD' of the differential signal based on the pattern of the sensing data Vsen, if it determines that the transmission loss is great.

The differential signal generator 240 may generate a differential signal having the final amplitude of differential VOD which is determined through the analyzing part 230. In more detail, the differential signal generator 240 may have the determined final amplitude of differential VOD, and may generate the two signals S1 and S2 which swing to opposite polarities in a preset interval. The differential signal generator 240 may output the generated signals S1 and S2 through the first signal line LL1 formed as a pair.

In an embodiment, the differential signal generator 240 may be a communicating part configured to receive and transmit data through an interface coupled to the timing controller 10, or may be a part of the communicating part, or may be configured to include the communicating part. Such a differential signal generator 240 may be connected to the first signal line LL1, and may be configured to convert the sensing data Vsen into a differential signal format conforming to the LVDS interface and output the converted signal to the first signal line LL1.

As described above, the data driver 20 may vary the voltage of differential VOD of the differential signal according to the pattern of the sensing data Vsen. That is, the data driver 20 may maintain or reduce the voltage of differential VOD of the differential signal, if it is determined that the transmission loss is great.

In the manner described above, the data driver 20 may transmit individual sensing data Vsen at a minimal voltage level substantially required to prevent the transmission error to the timing controller 10. Therefore, the power consumption used for transmitting or receiving the sensing data Vsen by the data driver 20 and the timing controller 10 may be minimized.

Figure 11:
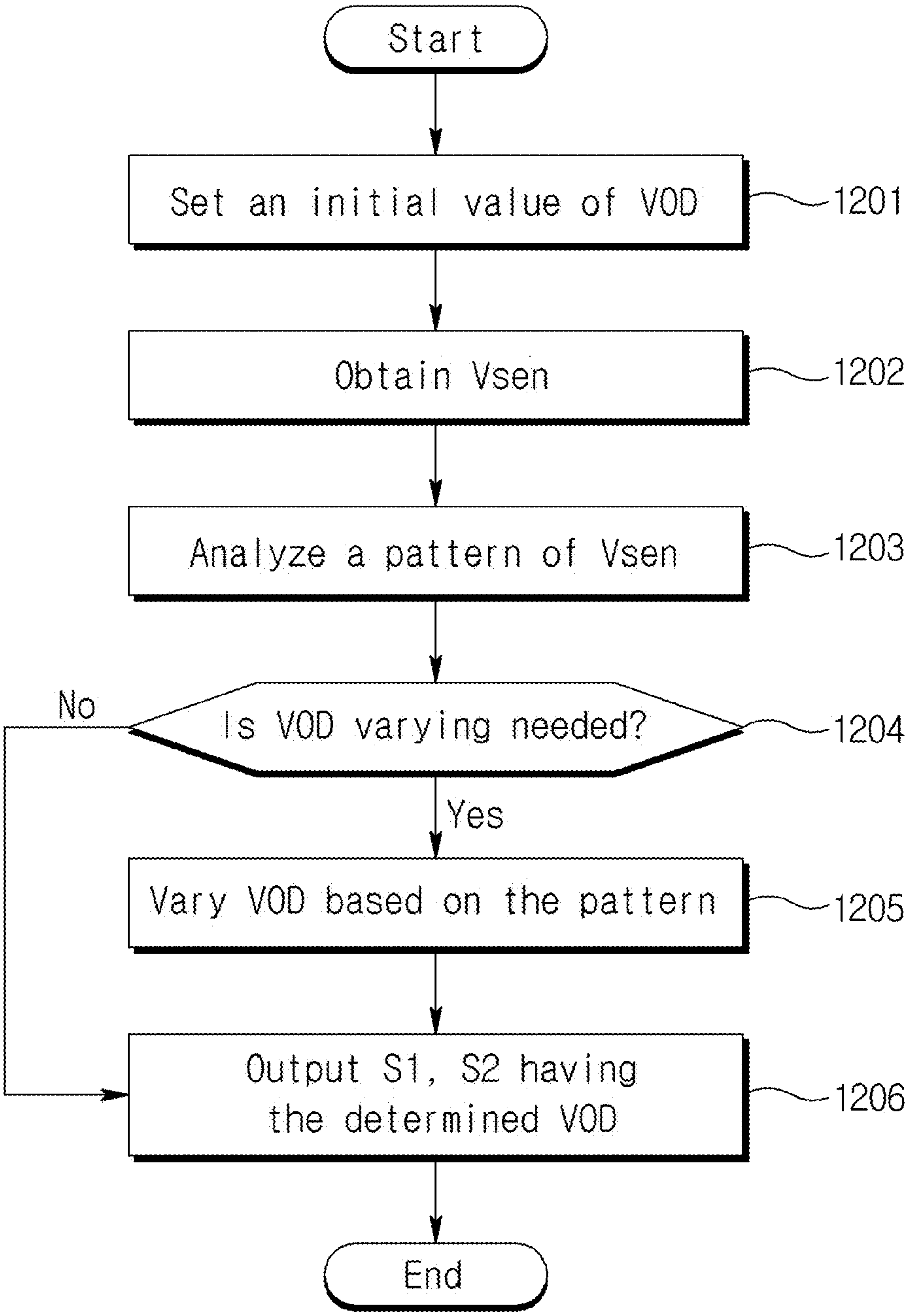
FIG. 11 is a flowchart illustrating a method for driving a display device according to an embodiment.

FIG. 11 is a flowchart illustrating a method for driving the display device according to an embodiment.

Referring to FIG. 11, after power-on, the display device 1 may set (1201) an initial value of the voltage of differential VOD of the differential signal in correspondence with the digital data value of the sensing data Vsen. The initial value may be preset and stored when the display device 1 is manufactured etc. based on the driving environment of the display device 1. The display device 1 may load the stored information, and may set the initial values of the voltage of differential VOD of the differential signal in correspondence with each of bit values of the sensing data Vsen in the digital data format.

While the display device is driven, the display device 1 may perform sensing of the pixels PX of the display panel 50. The pixel sensing may be performed before the display is driven (on-sensing), while the display is driven (real-time sensing), or after generation of a power-off signal (off-sensing).

The data driver 20 of the display device 1 may obtain (1202) the sensing data Vsen in a digital data format through the sensing of the pixels PX. The data driver 20 of the display device 1 may determine the voltage of differential VOD of the differential signal based on a bit value of the obtained sensing data Vsen. In more detail, the data driver 20 may select any one initial value in correspondence with the bit value of the obtained sensing data Vsen among the initial values of the voltage of differential VOD which have been set in correspondence with the bit values of the sensing data Vsen.

The data driver 20 of the display device 1 may analyze (1203) the pattern of the obtained sensing data Vsen. The data driver 20 may classify the pattern of the sensing data Vsen based on the degree of the transmission loss. For example, if the pattern of the sensing data Vsen is a pattern having a relatively small transmission loss (e.g., a first degree of loss), the analyzing part 230 may determine the pattern of the sensing data Vsen as the first pattern. If the pattern of the sensing data Vsen is a pattern having a relatively great transmission loss (e.g., a second degree of loss that is greater than the first degree), the analyzing part 230 may determine the pattern of the sensing data Vsen as the second pattern. If the pattern of the sensing data Vsen is a pattern having a very great transmission loss (e.g., a third degree of loss that is greater than the second degree), the analyzing part 230 may determine the pattern of the sensing data Vsen as the third pattern.

The data driver 20 of the display device 1 may determine (1204) whether to vary the voltage of differential VOD of the differential signal based on the analyzed pattern. For example, the data driver 20 may determine to maintain the voltage of differential VOD if the pattern of the sensing data Vsen is a pattern having a great transmission loss, and may determine to reduce the voltage of differential VOD if the pattern of the sensing data Vsen is a pattern having a small transmission loss. In another embodiment, the data driver 20 may determine to increase the voltage of differential VOD if the pattern of the sensing data Vsen is a pattern having a great transmission loss, and may determine to maintain the voltage of differential VOD if the pattern of the sensing data Vsen is a pattern having a small transmission loss.

If the data driver 20 determines to maintain the voltage of differential VOD of the differential signal, the data driver 20 of the display device 1 may generate and output (1206) the two signals S1 and S2 having a predetermined voltage of differential VOD and output the signals.

Meanwhile, if the data driver 20 determines to vary the voltage of differential VOD of the differential signal, the data driver 20 may generate the two signals S1 and S2 having a varied voltage of differential VOD in correspondence with the pattern of the sensing data Vsen and output the signals.

Figure 12:
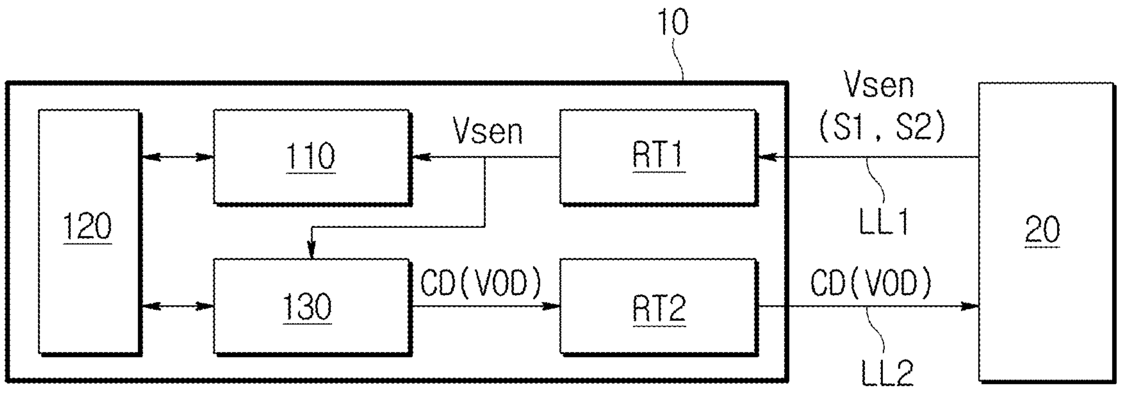
FIG. 12 is a block diagram illustrating a configuration of a timing controller according to another embodiment.

FIG. 12 is a block diagram illustrating a configuration of a timing controller according to another embodiment.

Referring to FIG. 12, a timing controller 10 according to another embodiment may include a first communicating part RT1, the compensation part 110, the memory 120, an analyzing part 130, and a second communicating part RT2.

The first communicating part RT1 (e.g., a first communicating circuit) is configured to transmit or receive data through an interface coupled to the data driver 20. For example, the first communicating part RT1 transmits or receives data through the first signal line LL1 set in correspondence with the LVDS interface. The first communicating part RT1 may receive the sensing data Vsen in the differential signal format conforming to the LVDS interface through the first signal line LL1.

The first communicating part RT1 may process data received through the first signal line LL1 and may transmit the processed data to other processing parts such as the compensation part 110, the memory 120, the analyzing part 130, and the like. For example, the first communicating part RT1 may perform processes such as parallelization or serialization, and upscaling or downscaling etc. of the data and may transmit the processed data to other processing parts.

The timing controller 10 may include one or more processing parts for extracting or recovering necessary signal and/or information from the processed data. For example, the compensation part 110 (e.g., a compensation circuit) may identify the feature values of the pixels PX (FIG. 1) from the processed sensing data Vsen, and may determine the compensation value for compensating the change of the feature values. The memory 120 may store the information extracted from the processed sensing data Vsen and/or the compensation value etc. determined through the compensation part 110.

The analyzing part 130 (e.g., an analyzing circuit) may analyze the pattern of the received sensing data Vsen. The sensing data Vsen received from the data driver 20 may be a pulse signal of which a logic high voltage and a logic low voltage are alternated in a certain pattern. For example, the sensing data Vsen may include at least one logic high period and at least one logic low period.

The analyzing part 130 may determine the voltage of differential VOD of the differential signal based on the pattern of the analyzed sensing data Vsen. In more detail, the analyzing part 130 may determine an initial amplitude of differential VOD' of the differential signal in correspondence with a bit value of the sensing data Vsen which is digital data. The initial amplitude of differential VOD' of the differential signal according to the bit value of the sensing data Vsen may be determined in advance when the display device 1 is manufactured, and may be stored in the memory (not illustrated) of the data driver 20 and the like. The analyzing part 130 may load information on the initial amplitude of differential VOD' which has been stored and may determine the initial amplitude of differential VOD' of the differential signal in correspondence with the sensing data Vsen.

In addition, the analyzing part 130 may analyze a pattern of the sensing data Vsen, and may determine whether to vary the determined initial amplitude of differential VOD' in correspondence with the analyzed pattern. To this end, the analyzing part 130 may determine the pattern of the sensing data Vsen according to a certain standard. The standard of the pattern classification is the same as the one described with reference to FIGS. 8 to 10, but is not limited thereto.

The analyzing part 130 may determine which pattern the sensing data Vsen corresponds to, based on a certain standard which has been defined per pattern. The analyzing part 130 may determine whether to vary the initial amplitude of differential VOD' of the differential signal based on the classified pattern of the sensing data Vsen.

For example, the analyzing part 130 may maintain the initial amplitude of differential VOD' of the differential signal which has been determined as it is, if the sensing data Vsen corresponds to a pattern having a relatively greater transmission loss (for example, the third pattern). The analyzing part 130 may step wisely reduce the initial amplitude of differential VOD' of the differential signal which has been determined, by as much as a certain voltage width (hereinafter, a step), if the sensing data Vsen corresponds to a pattern having a relatively smaller transmission loss.

In the embodiment, the step for reducing the initial amplitude of differential VOD' of the differential signal may be determined in correspondence with the degree of the transmission loss of the pattern of the sensing data Vsen. For example, if the degree of the transmission loss of the pattern of the sensing data Vsen is small, the initial amplitude of differential VOD' may be reduced by as much as one step, and if the degree of the transmission loss is great, the initial amplitude of differential VOD' may be reduced by a greater step than the one step (for example, two or more steps).

The analyzing part 130 may generate control data CD for controlling the voltage of differential VOD of the differential signal based on information on the varied voltage of differential VOD. For example, the analyzing part 130 may generate the control data including information on the initial amplitude of differential VOD', and information on the varied voltage of differential VOD in correspondence with the pattern of the sensing data Vsen (for example, a voltage value of the varied voltage of differential VOD and/or a difference between the initial amplitude of differential VOD' and the varied voltage of differential VOD etc.).

In the embodiment, a variable value as the information on the varied voltage of differential VOD may be indicated as 2-bit data as disclosed in Table 3. However, what is disclosed in Table 3 is merely an embodiment, and the present disclosure is not limited thereto, and the variable value may be indicated to data of more bits.

TABLE 3

| 2-bit data | amplitude of differential of a differential signal |
|---|---|
| "LL" | reduce by as much as one step |
| "LH" | reduce by as much as two steps |
| "HL" | reduce by as much as three steps |
| "HH" | maintain |

The analyzing part 130 may transmit the control data CD for controlling the voltage of differential VOD of the differential signal to the data driver 20 through the second communicating part RT2. The second communicating part RT2 may process alignment and/or modulation of the control data CD in correspondence with the interface (for example, EPI interface) coupled to the data driver 20, and transmit the processed data to the data driver 20 through the second signal line LL2.

The data driver 20 may determine the amplitude of differential of a differential signal of the sensing data Vsen, which will be transmitted thereafter, based on the control data CD. In more detail, after the sensing of the display panel 50, the data driver 20 may generate the two signals S1 and S2 according to the voltage of differential determined by the control data to the timing controller 10.

In this embodiment, the voltage of differential VOD of the differential signal of the sensing data Vsen transmitted from the data driver 20 is based on a pattern of the sensing data Vsen which has been transmitted to the timing controller 10 at a previous sensing. Generally, the feature values of the pixels PX have gradual changes, therefore, a difference between patterns of the previous sensing data Vsen and the next sensing data Vsen may not be great. That is, the timing controller 10 may determine the voltage of differential VOD of the sensing data Vsen to be received next time based on the pattern of the sensing data Vsen which has been received immediately previously.

From the foregoing description of the embodiments with reference to accompanying drawings, those skilled in the art to which this invention pertains can understand that the present invention may be embodied in other specific forms without changing the technical spirit or essential characteristics of the invention. In this connection, the above-described embodiments should be understood as exemplary and as not limiting in all aspects. The scope of the present disclosure is represented by the appended claims, rather than the foregoing detailed description. In addition, all changes or modified forms derived from the meaning and range of the appended claims and the equivalents thereof are included in the scope of the present disclosure.

What is claimed is:

1. A display device, comprising:

a display panel including a plurality of pixels;

a data driver configured to generate sensing data that is indicative of feature values of the plurality of pixels, convert the sensing data into a differential signal where an amplitude of the differential signal is varied by the data driver based on a pattern of the sensing data, and output the differential signal; and a timing controller configured to receive the differential signal, generate a compensation value for compensating image data based on the differential signal, and transmit a compensation value to the data driver, wherein the data driver is configured to compensate the image data based on the compensation value received from the timing controller, wherein the data driver is configured to classify the pattern of the sensing data based on whether the sensing data comprises a pulse of one unit interval and a length of a logic low period before or after the pulse of one unit interval, wherein the data driver is configured to vary the amplitude of the differential signal to one of two or more different amplitudes, and wherein the data driver is configured to:

classify the sensing data into a first pattern responsive to the sensing data lacking a pulse of one unit interval, classify the sensing data into a second pattern signifying a second level of transmission loss that is greater than a first level of transmission loss responsive to the sensing data comprising the pulse of one unit interval after a logic low period having a duration that is greater than or equal to a first threshold value and less than a second threshold value, and classify the sensing data into a third pattern signifying a third level of transmission loss that is greater than the second level of transmission loss responsive to the sensing data comprising the pulse of one unit interval after a logic low period having a duration that is greater than or equal to the second threshold value.

2. The display device of claim 1, wherein the data driver transmits the differential signal to the timing controller through a transmission line that conforms to a preset interface.

3. The display device of claim 1, wherein the data driver is configured to determine an initial amplitude of the differential signal that corresponds to a bit value of the sensing data, and determine a final amplitude of the differential signal by maintaining the initial amplitude of the differential signal or varying the amplitude of differential signal based on the pattern of the sensing data.

4. The display device of claim 1, wherein the data driver is configured to classify the pattern of the sensing data based on an amount of a transmission loss of the display device and vary the amplitude of differential signal based on the classified pattern.

5. The display device of claim 1, wherein the differential signal is a pulse signal comprising at least one logic high period and at least one logic low period.

6. The display device of claim 1, wherein the first threshold value is two unit intervals and the second threshold value is three unit intervals.

7. The display device of claim 1, wherein the data driver is configured to classify the sensing data into the first pattern responsive to a duration of a logic high period of pulses of the sensing data and a duration of the logic low period before the pulses being a same.

8. The display device of claim 7, wherein the data driver is configured to vary the amplitude of the differential signal in a step wise manner according to the pattern of the sensing data.

9. The display device of claim 8, wherein the data driver is configured to maintain the amplitude of the differential signal responsive to the sensing data having the third pattern, and decreases the amplitude of the differential signal by a first amount of steps responsive to the sensing data having the first pattern, and decrease the amplitude of the differential signal by a second amount of steps that is less than the first amount of steps responsive to the sensing data having the second pattern.

10. The display device of claim 1, wherein the data driver comprises:

a sensing circuit configured to sense the feature values of the plurality of pixels and generate the sensing data;

an analyzing circuit configured to analyze the pattern of the sensing data and determine the amplitude of the differential signal based on the analyzed pattern; and a differential signal generator configured to generate the differential signal having the amplitude determined by the analyzing circuit and output the generated differential signal.

11. A method for driving a display device, comprising:

setting an initial value of an amplitude of a differential signal in correspondence with digital data of sensing data;

obtaining the sensing data that is indicative of feature values of a plurality of pixels, the sensing data including a pattern;

determining a final amplitude of the differential signal by maintaining the initial value of the amplitude of the differential signal or varying the initial value based on the pattern of the sensing data; and outputting the differential signal having the final amplitude, wherein the differential signal is output through a transmission line conforming to a preset interface, wherein determining the final amplitude of differential signal comprises:

classifying the pattern of the sensing data based on whether the sensing data comprises a pulse of one unit interval and a length of a logic low period before or after the pulse of one unit interval;

varying the amplitude of the differential signal to one of two or more different amplitudes;

classifying the sensing data into a first pattern responsive to the sensing data lacking the pulse of one unit interval;

classify the sensing data into a second pattern signifying a second level of transmission loss that is greater than a first level of transmission loss responsive to the sensing data comprising the pulse of one unit interval after a logic low period having a duration that is equal to or more than a first threshold value and less than a second threshold value; and classify the sensing data into a third pattern signifying a third level of transmission loss that is greater than the second level of transmission loss responsive to the sensing data comprising the pulse of one unit interval after a logic low period having a duration that is greater than or equal to the second threshold value.

12. The method for driving a display device of claim 11, wherein the differential signal is a pulse signal comprising at least one logic high period and at least one logic low period.

13. The method for driving a display device of claim 11, wherein determining the final amplitude of differential signal further comprises:

maintaining the amplitude of the differential signal responsive to the sensing data having the third pattern;

decreasing the amplitude of the differential signal by a first amount of steps responsive to the sensing data having the first pattern; and decreasing the amplitude of the differential signal by a second amount of steps that is less than the first amount of steps responsive to the sensing data having the second pattern.

14. A display device, comprising:

a display panel including a plurality of pixels;

a data driver configured to generate sensing data that is indicative of feature values of the plurality of pixels, convert the sensing data into a differential signal, and output the differential signal; and a timing controller configured to compensate image data based on the differential signal and transmit a compensation value to the data driver, vary an amplitude of the differential signal based on a pattern of the sensing data, and transmit control data comprising information on the varied amplitude to the data driver, wherein the timing controller is configured to classify the pattern of the sensing data based on whether the sensing data comprises a pulse of one unit interval and a length of a logic low period before or after the pulse of one unit interval, wherein the timing controller is further configured to vary the amplitude of the differential signal to one of two or more different amplitudes, and wherein the data driver is further configured to:

classify the sensing data into a first pattern responsive to the sensing data lacking the pulse of one unit interval, classify the sensing data into a second pattern signifying a second level of transmission loss that is greater than a first level of transmission loss responsive to the sensing data comprising the pulse of one unit interval after a logic low period having a duration that is greater than or equal to a first threshold value and less than a second threshold value, and classify the sensing data into a third pattern signifying a third level of transmission loss that is greater than the second level of transmission loss responsive to the sensing data comprising the pulse of one unit interval after a logic low period having a duration that is greater than or equal to the second threshold value, and wherein the timing controller is configured to maintain the amplitude of the differential signal responsive to the sensing data having the third pattern, and decrease the amplitude of the differential signal by a first amount of steps responsive to the sensing data having the first pattern, and decrease the amplitude of the differential signal by a second amount of steps that is less than the first amount of steps responsive to the sensing data having the second pattern.

15. The display device of claim 14, wherein the timing controller receives the sensing data from the data driver through a first transmission line conforming to a first interface protocol, and transmits the control data from the timing controller through a second transmission line conforming to a second interface protocol that is different from the first interface protocol.

16. The display device of claim 15, wherein the control data indicates a variable value of the amplitude of differential as at least 2-bit data.

17. The display device of claim 14, wherein the differential signal is a pulse signal comprising at least one logic high period and at least one logic low period.

* * * * *